UNITED STATES PATENT OFFICE.

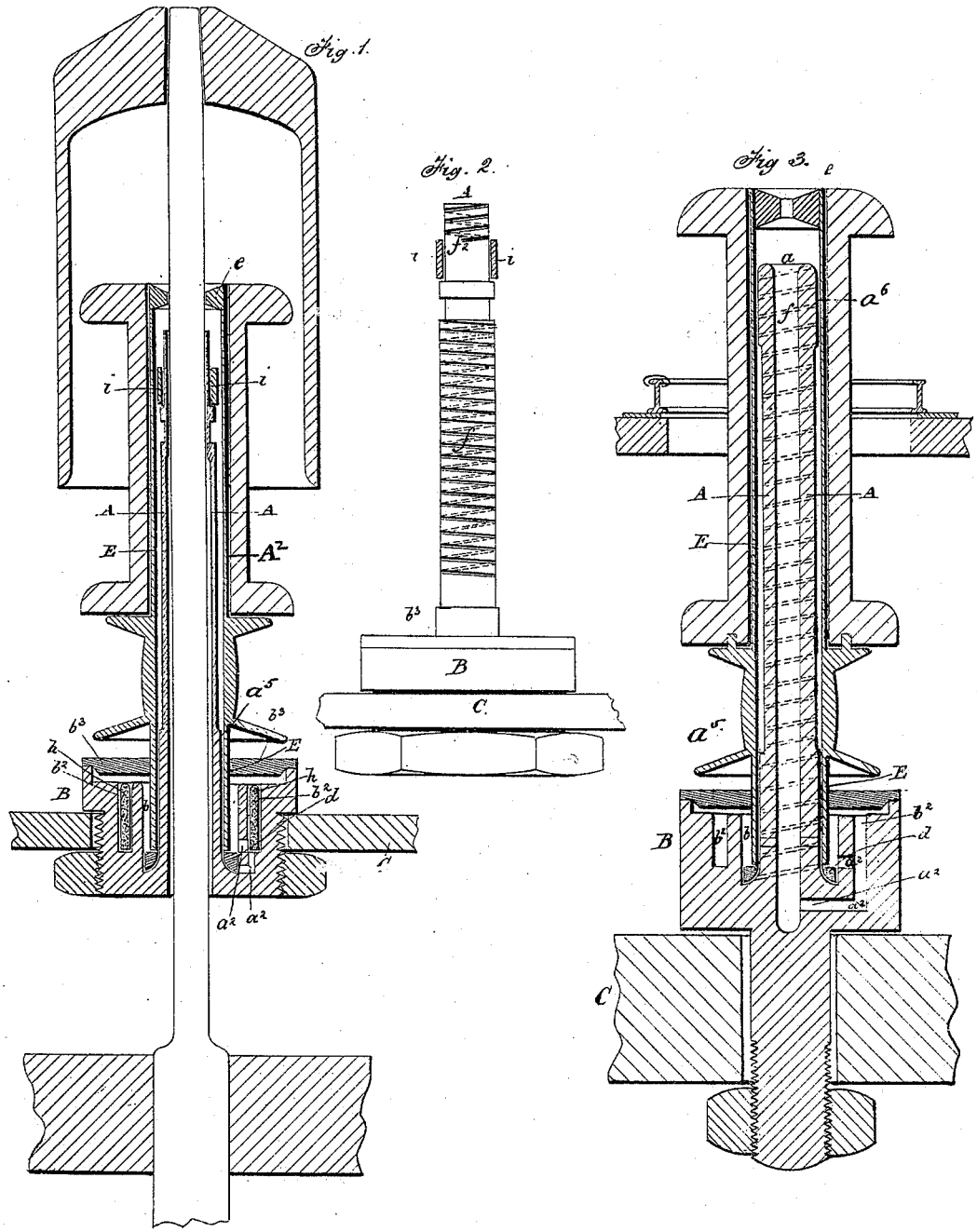

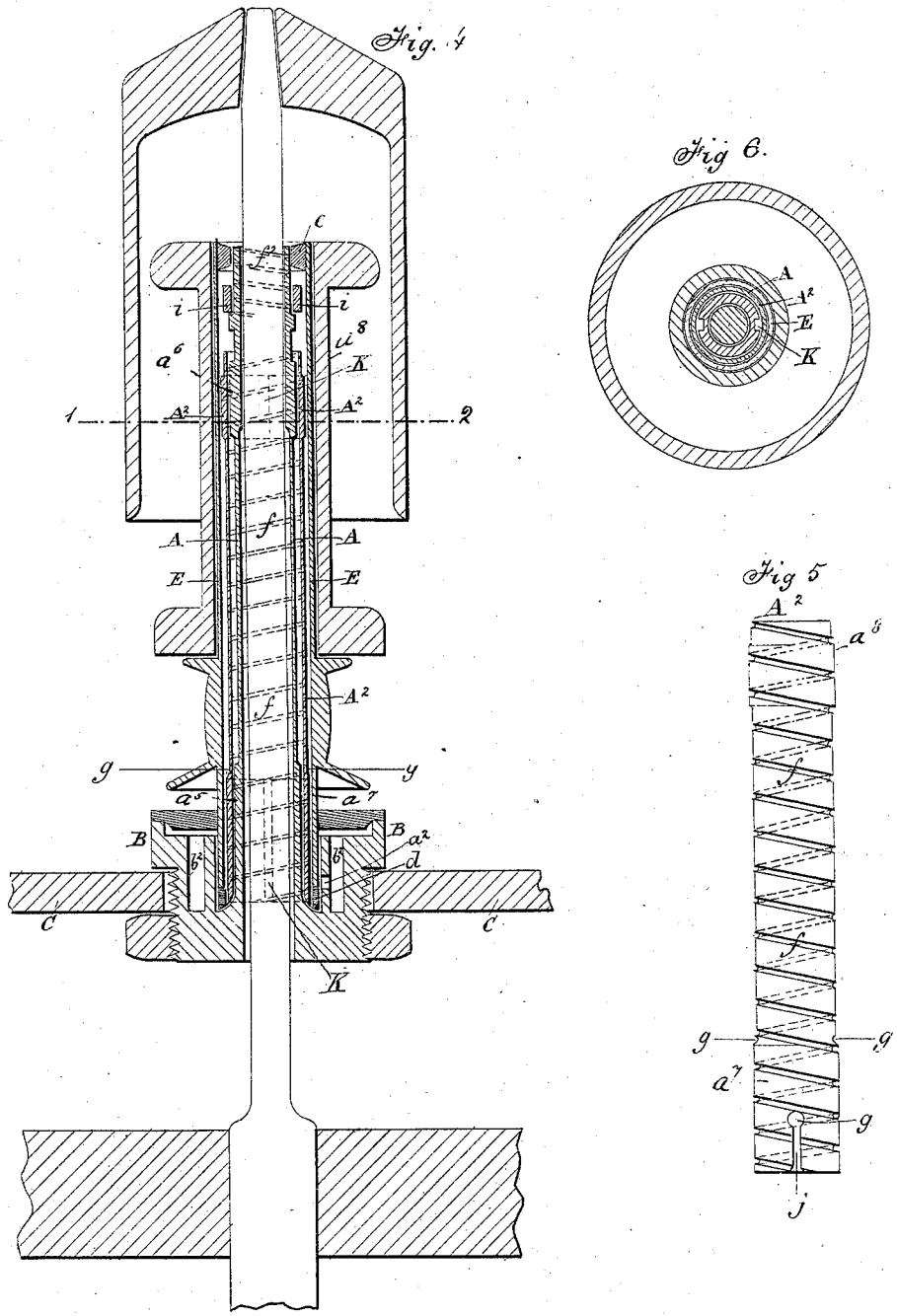

JOHN BONNY DEWHURST, THOMAS HENRY DEWHURST, AND ROBERT CORNTHWAITE, OF SKIPTON, COUNTY OF YORK, ENGLAND.

SPINDLE AND BEARING THEREFOR.

SPECIFICATION forming part of Letters Patent No. 316,758, dated April 28, 1885.

Application filed June 9, 1883. (No model.) Patented in England November 16, 1882, No. 5,464; in France March 27, 1883, No. 154,492, and in Belgium March 27, 1883, No. 60,854.

*To all whom it may concern:*

Be it known that we, JOHN BONNY DEWHURST and THOMAS HENRY DEWHURST (of the firm of John Dewhurst & Sons) and ROBERT CORNTHWAITE, all subjects of the Queen of Great Britain, and all residing at Skipton, county of York, England, have jointly invented certain Improvements in Spindles and Bearings Therefor, (for which we have obtained a patent in Great Britain, No. 5,464, dated November 16, 1882, and for which we have made applications in France, dated March 27, 1883, and Belgium, dated March 27, 1883,) of which the following is a specification.

Our improvements in spindles and bearings therefor have for their object to provide a better bearing for and lubrication of the spindles of such machines, so as to produce great steadiness with a high speed, and otherwise to improve the said machines, as hereinafter described. For this purpose, in spinning, twisting, and doubling machines, known as "cap-frames" and "ring-frames" or "ring-throstles," we provide a special bearing (formed and arranged in connection with the other parts, as hereinafter described) for the positively-driven wharve-tube to revolve on.

In order that our said invention may be fully understood we shall now proceed more particularly to describe the same, and for that purpose shall refer to the several figures in the annexed drawings, the same letters of reference indicating corresponding parts in all the figures.

Figure 1 represents a spindle and bobbin of a cap-frame to which our invention is applied. The special bearing A, hereinbefore referred to, surrounds the cap-spindle, and is formed in one with a cup-like seating, B, the said cup-like seating B being fixed to the collar-rail C or lifter-plate. Fig. 2 is an elevation of the special bearing, oil-cup, and collar-rail. The said cup-like seating B constitutes an oil-well, $b$, which may be provided with an annular division-wall, forming a space, $b^2$, communicating with the space $b$ by suitable perforation or perforations, as at $a^2$, the object being to prevent the whirling or splashing out of the oil. In the oil-well $b$ a loose washer, $d$, (or two or more such washers,) may be placed to form a bearing for the lower end of the wharve-tube E.

The said wharve-tube E at top may extend beyond the aforesaid special bearing A, so as to give space in the said wharve-tube E for a bush or filling piece, $e$, to prevent oil from escaping at the upper part of the said tube. Oil being placed in the oil-cup $b$ or space $b^2$, the said oil, when the wharve-tube rotates, may be carried up between the inner surface of the wharve-tube E and the outer surface of the special bearing A by a helical or screw-like recess or recesses, $f$, cut or formed in or on one or other, or both, of the opposed surfaces for the lubrication of the upper parts of the said bearing, or oil may be applied at the top of the wharve-tube, and the helical recess or recesses be dispensed with. It is preferred, in order to lessen friction between the wharve-tube E and the special bearing A, that they be not in contact throughout their whole length. To this end the part A is constructed to furnish bearings for the wharve-tube at two places, at the bottom and at the top, being at other points of a diameter less than that of the bearings. The lower bearing is furnished by the enlarged portion $a^5$ of the part A, and the upper bearing by the ring or bush $i$, interposed between the parts A and E, and fitting each loosely, Fig. 1, or by another enlarged portion, $a^6$, Figs. 3 and 4.

To prevent oil from flowing out at the top of the said special bearing a reverse screwlike recess, $f^2$, may be provided for a short distance at the upper end of either the wharve-tube E or the special bearing A, (or both,) to direct the oil downward. A washer or washers, $h$, made of cloth or other fibrous material, may be placed in the annular space $b^2$, to prevent oil from passing too rapidly into the inner space, $b$.

Fig. 2 shows the helical grooves as being upon the exterior of the special bearing.

The oil-cup may be provided with a cover, $b^3$.

For ring-spinning the parts may be arranged substantially in the manner hereinbefore described, a ring and traveler being used instead of a cap. Fig. 3 is a vertical section of a special bearing and wharve-tube, as applied to a ring-frame, the said bearing and tube serving together the purpose of a spindle. In this case, as the lower parts of the interior of the special bearing may be closed, as shown, the oil, after passing up between the exterior of the bearing A and the interior of the wharve-tube E by the groove $f$, may be allowed to return to the oil-cup by passing at top through the opening or openings $a$ to the interior of the aforesaid special bearing A and out by an opening or openings, $a^2$, in the lower part of the said bearing A back into the oil-cup $b$ or into the space $b^2$.

Fig. 4 represents in vertical section a spindle of a cap-frame in which a return-flow of the oil is secured by forming the special bearing with an additional tube, $A^2$, fixed to or fitted upon the part A, and leaving a space between the said part $A^2$ and the wharve-tube E for the ascent of the oil by the helical groove or grooves $f$, formed on the exterior of the part $A^2$ or on the interior of the wharve-tube, or both. Fig. 5 is a separate view of the part $A^2$, and Fig. 6 is a section on the line 1 2, Fig. 4. The tube $A^2$ forms a bearing at the bottom between parts E and A by fitting the portion $a^5$ of the latter loosely, and by being provided on its outer surface with an enlarged portion, $a^7$, which in turn fits loosely the interior of part E. At the top a similar bearing is formed, the tube $A^2$ also having an enlarged portion, $a^8$, at that point.

The oil, when it reaches the top of the tube $A^2$, passes thereover and down the space between the parts A and $A^2$ back to the oil-cup. Vertical or helical grooves K may be made at intervals in the part $A^2$ or the part A at the bearing of the said parts upon one another, to allow the oil to readily descend, and holes or openings $g$ may be made through the part $A^2$ for the same purpose. In Fig. 5 we have shown a nick, $j$, (of which there may be one or more,) which may be cut at the lower end of the part $A^2$, to facilitate the passage of the oil from the interior of the said part $A^2$.

In Figs. 2, 3, 4, 5, and 6 we have marked the parts which correspond with Fig. 1 with the same letters of reference, and they will thereby be readily understood without further description.

Having now described and particularly ascertained the nature of our said invention and the manner in which the same is or may be used or carried into effect, we would observe, in conclusion, that what we consider to be novel and original, and therefore claim as the invention secured to us, is—

1. The combination of the special bearing A, the oil-cup B, the wharve-tube E, and the intermediate loose tube, $A^2$, forming a bearing at top and bottom for the said parts A and E, a helical groove being formed between the special bearing and the wharve-tube for producing an upward and downward flow of oil between said bearing and tubes, substantially as set forth.

2. The combination of the special bearing A, the oil-cup B, the wharve-tube E, and the intermediate loose tube, $A^2$, forming a bearing at top and bottom for the said parts A and E, the tube $A^2$ having in its outer surface a helical groove for raising oil between said tube and the part E, and the bearing A having a reverse helical groove for returning oil between said tube and bearing, substantially as set forth.

3. The combination of the special bearing A, oil-cup B, and wharve-tube E, said bearing and tube having between them a helical groove for raising oil, which groove terminates below the top of the bearing, and a reverse helical groove above the first-mentioned groove for forcing down the oil and preventing overflow, substantially as set forth.

4. The combination, with the special bearing A, oil-cup B, and wharve-tube E, of the loose collar $i$, between and forming bearings for said parts A and E, there being formed between said parts a helical groove for carrying oil up to and over the outer surface of the collar $i$, and a reverse helical groove above said collar for returning the oil to the inner surface of the same, substantially as set forth.

5. The combination of the special bearing A, oil-cup B, and wharve-tube E, said oil-cup having an annular partition with apertures $a^2$, and a washer, $h$, of fibrous material, adapted to cover said apertures, for limiting and regulating the feeding of the oil to the bearing, substantially as set forth.

In testimony whereof we have signed our names to this specification in the presence of two subscribing witnesses.

JOHN BONNY DEWHURST.
THOMAS HENRY DEWHURST.
ROBERT CORNTHWAITE.

Witnesses:
JOHN GURNEY,
L. DARLYSHIE,
   *Both of Swan Arcade, Bradford.*